(12) United States Patent
Maletsky (10) Patent No.: US 8,707,037 B2
(45) Date of Patent: Apr. 22, 2014

(54) CRYPTOGRAPHIC AUTHENTICATION APPARATUS, SYSTEMS AND METHODS

(75) Inventor: Kerry Maletsky, Monument, CO (US)

(73) Assignee: Atmel Corporation, San Jose, CA (US)

( * ) Notice: Subject to any disclaimer, the term of this patent is extended or adjusted under 35 U.S.C. 154(b) by 1601 days.

(21) Appl. No.: 12/105,128

(22) Filed: Apr. 17, 2008

(65) Prior Publication Data

US 2009/0265411 A1 Oct. 22, 2009

(51) Int. Cl.
*H04L 9/32* (2006.01)
(52) U.S. Cl.
USPC ......................................................... 713/168
(58) Field of Classification Search
USPC ......................................................... 713/168
See application file for complete search history.

(56) References Cited

U.S. PATENT DOCUMENTS

| | | | |
|---|---|---|---|
| 5,504,867 A * | 4/1996 | Bosshart | 712/234 |
| 6,981,156 B1 * | 12/2005 | Stern et al. | 726/12 |
| 2005/0160265 A1 * | 7/2005 | Tanaka et al. | 713/168 |
| 2008/0279373 A1 * | 11/2008 | Erhart et al. | 380/46 |

* cited by examiner

*Primary Examiner* — Teshome Hailu
(74) *Attorney, Agent, or Firm* — Fish & Richardson P.C.

(57) ABSTRACT

Apparatus, systems, and methods send an interrogation command from an interrogation and timing apparatus to a timed identification (TID) apparatus. The TID apparatus receives the interrogation command, performs a series of logical operations to calculate a response, and returns the response within a maximum length of time established by the interrogation and timing apparatus. The interrogation and timing apparatus confirms that the length of time between sending the interrogation command and receiving the response is within the maximum length of time and that the response is correct. If so, the TID apparatus is authenticated. Additional embodiments are disclosed and claimed.

21 Claims, 3 Drawing Sheets

CRYPTOGRAPHIC AUTHENTICATION APPARATUS, SYSTEMS AND METHODS

TECHNICAL FIELD

The present application relates generally to the field of computer cryptographics and in one example to apparatus, systems, and methods for detecting software cloning of a cryptographic apparatus.

BACKGROUND INFORMATION

As the wireless transmission of sensitive data has become more pervasive, encryption techniques are increasingly used to maintain the confidentiality of information flowing across radio frequency links. Generally speaking, current security methods depend upon the confidentiality of stored secrets. An attacker may or may not be successful in learning the secrets from encryption hardware or software via microprobing or other well-known types of attacks. However, the secrets may be exposed using non-technical methods such as physical threats, extortion, and bribes, among others.

Effective authentication methods may therefore assume that the stored secrets have been revealed. Once the secrets are revealed, powerful software tools are readily available to an imposter who may attempt to emulate suspected cryptographic paths and techniques in order to imitate a legitimate user entity.

DETAILED DESCRIPTION

Figure 1:
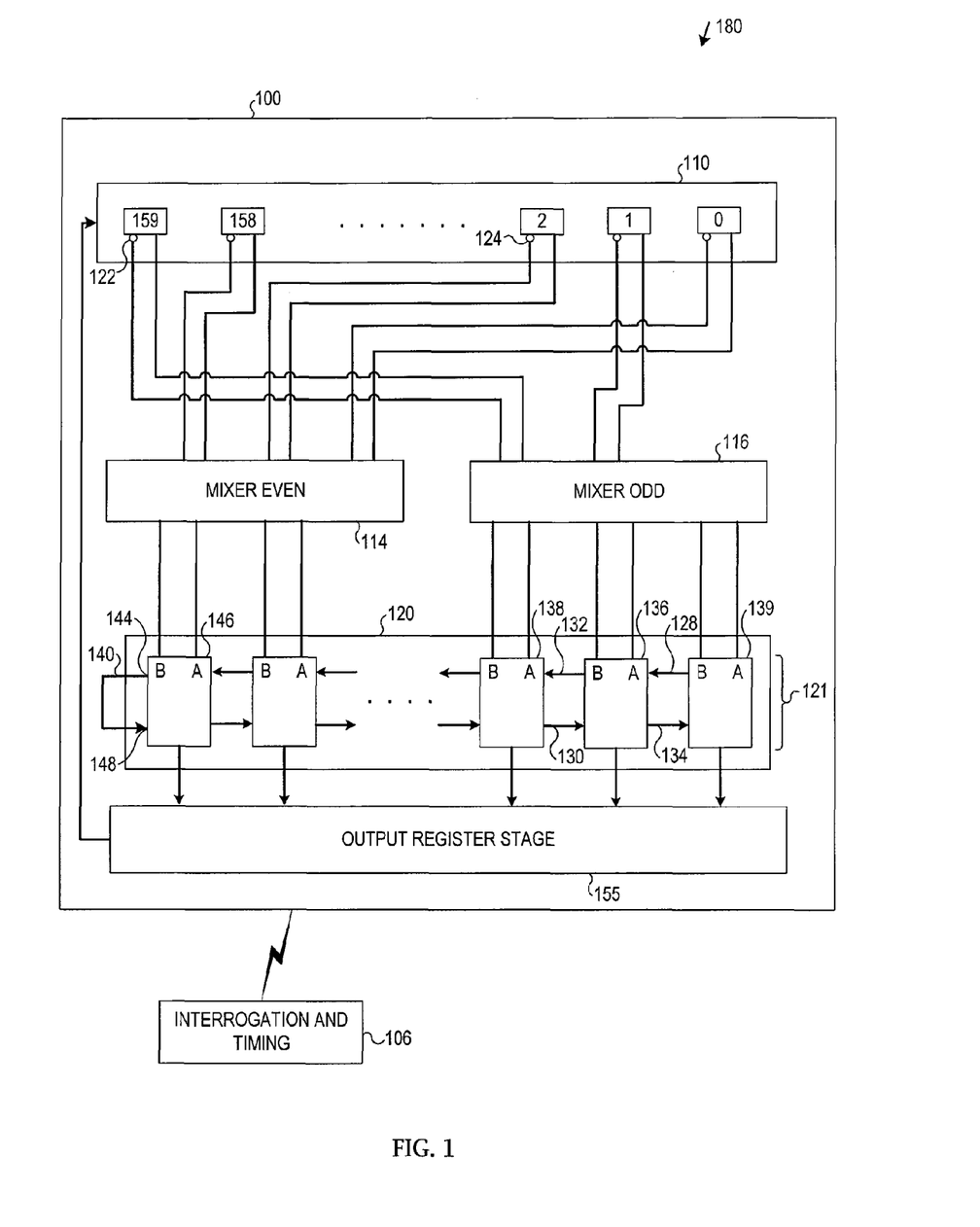
FIG. 1 is a block diagram of an apparatus and a system according to an example embodiment.

FIG. 1 is a block diagram of an apparatus 100 and a system 180 according to an example embodiment. An interrogation and timing apparatus may attempt to authenticate a sender of a data sequence received at the interrogation and timing apparatus. For example, a radio-frequency identification (RFID) controller may attempt to authenticate RFID responses to RFID interrogations sent by the RFID controller. Without a reliable authentication system in place, an unscrupulous entity may substitute one or more clone RFID tags for legitimate RFID tags. The clone RFID tags may contain intentionally substituted user information in an attempt to effect a fraudulent RFID transaction.

Timed Identification Apparatus

In some embodiments a timed identification (TID) apparatus may include the apparatus 100. Such embodiments may be capable of interrogation by an interrogation and timing apparatus 106. Upon interrogation, the apparatus 100 may calculate and return an answer word to the interrogation and timing apparatus 106. The apparatus 100 may need to calculate and return the answer word within a maximum time allotted by the interrogation and timing apparatus 106 in order to be authenticated by the interrogation and timing apparatus 106.

The apparatus 100 may be integrated as combinational logic in hardware, including integration on a die. Some embodiments may be all-combinational except for a feedback circuit to clock a set of outputs back to a set of inputs in order to effect subsequent calculation iterations. So implemented, the apparatus 100 may operate at a speed sufficient to perform the calculations within the allotted time. A microprocessor-driven software clone of the apparatus 100 may, on the other hand, take one or more orders of magnitude more time than the apparatus 100 to calculate the answer word. The software clone may thus be distinguishable from an authentic device by the differential speed of calculation of the two devices. That is, the apparatus 100 is designed to be measurably faster than the fastest software clone system anticipated to be employed by an imposter.

In some embodiments, functional structures of the apparatus 100 may be disguised to render micro-probing more difficult. For example, silicon-layer interconnections between stages of the apparatus 100 may be implemented instead of or in addition to metallization layer interconnections. False interconnections in the metallization layers or false contact pads may also be implemented to disguise functional structures associated with the apparatus 100.

Input Register Stage

The apparatus 100 may optionally include an input register stage 110 comprising one or more input registers. The input registers may store an input word (e.g., a binary input word) including bits to be acted upon by other sections of the apparatus 100 to obtain the answer word. In some embodiments the input word may comprise a device serial number, an input word received from the interrogation and timing apparatus 106 or from some other source, and/or a random number generated at the interrogation and timing apparatus 106 and/or at the apparatus 100. In some embodiments, outputs from the apparatus 100 may be clocked back into the input register stage 110 to be used in a subsequent iteration of operations performed by the apparatus 100. Such clocking of the outputs back to the inputs may be repeated for a selected number of iterations.

Bit Mixers

The apparatus 100 may also optionally include one or more bit mixers (e.g., the bit mixers 114 and 116) coupled to the input register stage 110. The bit mixers 114, 116 operate to mix a bit order associated with bits of the input word stored in the input register stage 110. In some embodiments the bit mixers 114, 116 may comprise connections (e.g., connections within an integrated circuit version of the apparatus 100) and may include no active components. It is noted that bit mixing may contribute significantly to the differential speed of calculation between an authentic device and a software-implemented clone, because a microprocessor may require a significant number of cycles to perform the bit-mixing function.

Calculation Stage

The apparatus 100 may further include one or more calculation stages (e.g., the calculation stage 120) coupled to the bit mixers 114, 116. The calculation stage 120 may receive a bit-mixed word (e.g., from the bit mixers 114, 116) and may perform a series of calculations on the bit-mixed word. In some embodiments, the width of the calculation stage 120 may be chosen to exceed the word width of commonly available microprocessors (e.g., the width of the calculation stage 120 may be chosen as 66 bits, which exceeds the word width of a commonly-available 64-bit microprocessor, or 160 bits, which exceeds a double word length of a 64-bit microprocessor). Using a 160-bit width for the calculation stage 120 is merely an example. Other widths, including widths smaller than word lengths associated with commonly-available microprocessors, are contemplated by this disclosure.

The calculation stage 120 may comprise an ordered series of calculation sub-modules 121, each sub-module to perform a calculation upon a selected number of bits stored in the input register stage. The calculation sub-modules 121 may comprise single-bit adders, for example, including ripple-carry adders.

Some embodiments may use functions other than adders to implement the calculation sub-modules 121. For example, a subtraction sub-module may be implemented by using complement bit position outputs of the input register 110 (e.g., the outputs 122 and 124) as inputs to adders used as the calculation sub-modules 121. Thus, for example, in some embodiments the "B" input to the adder may be inverted. In an embodiment where every input to the calculation stage 120 goes to one "A" input and another "B" input, both states of the input term may contribute to the net output term.

Each of the calculation sub-modules 121 may include one or more carry inputs and outputs (e.g., the carry inputs 128 and 130 and the carry outputs 132 and 134 of the ripple-carry adder 136). Using ripple-carry adders as an example of the calculation sub-modules 121, a first carry output (e.g., the left-going carry output 132) may be associated with each ripple-carry adder (e.g., the ripple-carry adder 136) in an ordered series of ripple-carry adders. The first carry output 132 propagates a first carry result of a calculation performed by the ripple-carry adder to a first carry input of a next higher-order ripple-carry adder (e.g., the next higher-order ripple-carry adder 138). The first carry result may be used in a calculation performed by the next higher-order ripple-carry adder 138.

Likewise, a second carry output may be associated with each rippled-carry adder (e.g., the right-going second carry output 134 associated with the ripple-carry adder 136). The second carry output 134 may propagate a second carry result of the calculation performed by the ripple-carry adder 136 to a next lower-order ripple-carry adder (e.g., to the ripple-carry adder 139) to be used in a calculation performed by the next lower-order ripple-carry adder 139. Other numbers of carries are possible, as previously mentioned. Additionally, some embodiments may use other carry connection schemes, including asymmetrical carry schemes that may, for example, skip one or more calculation sub-modules in the calculation stage 120.

Some embodiments may also include a feedback circuit 140 associated with the calculation stage 120. The feedback circuit 140 may apply a carry output of the calculation stage 120 to a carry input of the calculation stage 120. Again using ripple-carry adders as an example of the calculation sub-modules 121, a first carry output 144 of a highest-order ripple-carry adder 146 may be fed back to a second carry input 148 associated with the highest-order ripple-carry adder 146.

Carry Formulas

Some embodiments may use non-standard carry formulas to prevent the use of the ADD instruction in a microprocessor-based clone and to force the use of more time-consuming multiple single logic function instructions. The carry formulas may be selected such that the output of each of the calculation sub-modules 121 has a substantially uniform distribution of 1's and 0's. This may help to prevent an attacker from exploiting asymmetrical distributions to skip some calculations.

The carry circuit in a normal adder is $c_{out}=ab+ac+bc$, where c is the carry input. Some embodiments herein may use carry equations of the form $C_{out}=AB+BC_{in}+abc_{in}$ for both the first and second carry outputs, where "A" is the inversion of "a," "B" is the inversion of "b," and "C" is the inversion of "c." The 24 possible equations of this form are:

| | | | |
|---|---|---|---|
| C0  | cab | CB | CA |
| C1  | Cab | cB | cA |
| C2  | cAb | CB | Ca |
| C3  | Cab | cB | ca |
| C4  | caB | CA | Cb |
| C5  | CaB | cA | cb |
| C6  | cAB | Ca | Cb |
| C7  | CAB | ca | cb |
| C8  | abc | AC | AB |
| C9  | Abc | aC | aB |
| C10 | aBc | AC | Ab |
| C11 | Abc | aC | ab |
| C12 | abC | AB | Ac |
| C13 | AbC | aB | ac |
| C14 | aBC | Ab | Ac |
| C15 | ABC | ab | ac |
| C16 | bac | BC | BA |
| C17 | Bac | bC | bA |
| C18 | bAc | BC | Ba |
| C19 | Bac | bC | ba |
| C20 | baC | BA | Bc |
| C21 | BaC | bA | bc |
| C22 | bAC | Ba | Bc |
| C23 | BAC | ba | bc |

In some embodiments, each of the calculation sub-modules 121 may have a different combination of equations for the left and right carries to prevent table lookup of the carry outputs. Some embodiments may use two carry outputs for each bit circuit, one going left and the other right, as described above. Some embodiments may choose the equations for the carry circuits from the table above at random to increase the likelihood that most bits are unique. In some embodiments, the sum output of each block may be the exclusive "OR" (XOR) of all four inputs (e.g., the A and B inputs and the first and second carry inputs). Because of the properties of the XOR, every input may need to be calculated before the sub-module output is known.

Bit Mixing

Turning back to the issue of bit mixing at the inputs to the calculation sub-modules 121, some embodiments may use the same input in two adjacent bits for the low-order 80 bits of the example 160-bit calculation stage 120. That is, a low-order calculation sub-module (e.g., the calculation sub-module 136) may include a given input in its inverted form. The next most significant calculation sub-module (e.g., the calculation sub-module 138) may include that same input in its true form. In some embodiments the mix configuration for the high-order 80 bits of the calculation stage 120 may be chosen at random.

An analysis of the operation of a connection matrix as described above shows that all of the outputs are comprised of 96% or more of the inputs directly, plus the carry circuit effects, after ten iterations. Further analysis shows that after ten iterations no sum term includes the same bit combination as any other sum term. It is noted that the carry terms may always be well mixed, because the carry inputs to each bit include every input in their equation (one part of the input bits coming along with the "left" carry and the remaining input bits contributing to the "right" carry). The following table illustrates an example set of bit connection and carry configuration assignments in accordance with the above-described embodiments.

| | Block Connections | | Carry Functions | |
|---|---|---|---|---|
| Output- | A input | B input- | CR | CL |
| 0 | 16 | 132 | 12 | 16 |
| 1 | 132 | 33 | 13 | 4 |
| 2 | 33 | 5 | 0 | 14 |
| 3 | 5 | 116 | 22 | 2 |
| 4 | 116 | 69 | 13 | 9 |
| 5 | 69 | 98 | 23 | 5 |
| 6 | 98 | 93 | 9 | 5 |
| 7 | 93 | 143 | 13 | 23 |
| 8 | 143 | 99 | 2 | 22 |
| 9 | 99 | 117 | 20 | 21 |
| 10 | 117 | 45 | 9 | 1 |
| 11 | 45 | 62 | 9 | 13 |
| 12 | 62 | 81 | 8 | 10 |
| 13 | 81 | 83 | 3 | 14 |
| 14 | 83 | 28 | 23 | 22 |
| 15 | 28 | 136 | 22 | 7 |
| 16 | 136 | 122 | 15 | 11 |
| 17 | 122 | 47 | 12 | 8 |
| 18 | 47 | 100 | 17 | 2 |
| 19 | 100 | 9 | 17 | 0 |
| 20 | 9 | 31 | 22 | 10 |
| 21 | 31 | 120 | 19 | 21 |
| 22 | 120 | 151 | 6 | 6 |
| 23 | 151 | 88 | 23 | 8 |
| 24 | 88 | 44 | 18 | 22 |
| 25 | 44 | 23 | 9 | 19 |
| 26 | 23 | 138 | 22 | 5 |
| 27 | 138 | 157 | 2 | 16 |
| 28 | 157 | 152 | 4 | 16 |
| 29 | 152 | 78 | 5 | 17 |
| 30 | 78 | 140 | 23 | 5 |
| 31 | 140 | 94 | 9 | 9 |
| 32 | 94 | 67 | 21 | 0 |
| 33 | 67 | 139 | 20 | 0 |
| 34 | 139 | 7 | 4 | 8 |
| 35 | 7 | 24 | 8 | 18 |
| 36 | 24 | 104 | 3 | 11 |
| 37 | 104 | 130 | 15 | 6 |
| 38 | 130 | 72 | 20 | 20 |
| 39 | 72 | 111 | 12 | 14 |
| 40 | 111 | 110 | 3 | 18 |
| 41 | 110 | 127 | 7 | 19 |
| 42 | 127 | 80 | 5 | 13 |
| 43 | 80 | 121 | 13 | 10 |
| 44 | 121 | 156 | 6 | 15 |
| 45 | 156 | 6 | 22 | 5 |
| 46 | 6 | 153 | 19 | 18 |
| 47 | 153 | 68 | 17 | 1 |
| 48 | 68 | 92 | 11 | 18 |
| 49 | 92 | 96 | 6 | 23 |
| 50 | 96 | 135 | 0 | 4 |
| 51 | 135 | 46 | 23 | 5 |
| 52 | 46 | 56 | 16 | 12 |
| 53 | 56 | 64 | 18 | 3 |
| 54 | 64 | 84 | 23 | 14 |
| 55 | 84 | 25 | 11 | 11 |
| 56 | 25 | 125 | 17 | 21 |
| 57 | 125 | 48 | 6 | 3 |
| 58 | 48 | 133 | 13 | 2 |
| 59 | 133 | 58 | 23 | 6 |
| 60 | 58 | 113 | 23 | 12 |
| 61 | 113 | 61 | 20 | 15 |
| 62 | 61 | 57 | 11 | 22 |
| 63 | 57 | 3 | 14 | 2 |
| 64 | 3 | 17 | 23 | 5 |
| 65 | 17 | 0 | 19 | 0 |

-continued

| | Block Connections | | Carry Functions | |
|---|---|---|---|---|
| Output- | A input | B input- | CR | CL |
| 66 | 0 | 141 | 6 | 5 |
| 67 | 141 | 60 | 20 | 4 |
| 68 | 60 | 10 | 14 | 4 |
| 69 | 10 | 66 | 8 | 11 |
| 70 | 66 | 15 | 14 | 19 |
| 71 | 15 | 50 | 4 | 19 |
| 72 | 50 | 79 | 0 | 21 |
| 73 | 79 | 114 | 10 | 18 |
| 74 | 114 | 115 | 22 | 13 |
| 75 | 115 | 131 | 17 | 4 |
| 76 | 131 | 37 | 22 | 21 |
| 77 | 37 | 18 | 18 | 1 |
| 78 | 18 | 2 | 18 | 7 |
| 79 | 2 | 16 | 20 | 19 |
| 80 | 137 | 85 | 12 | 20 |
| 81 | 95 | 36 | 16 | 20 |
| 82 | 55 | 91 | 12 | 22 |
| 83 | 63 | 63 | 5 | 23 |
| 84 | 86 | 27 | 2 | 12 |
| 85 | 43 | 128 | 10 | 15 |
| 86 | 108 | 95 | 15 | 1 |
| 87 | 159 | 159 | 23 | 13 |
| 88 | 39 | 73 | 0 | 18 |
| 89 | 11 | 20 | 14 | 21 |
| 90 | 82 | 134 | 15 | 2 |
| 91 | 36 | 26 | 20 | 13 |
| 92 | 87 | 101 | 6 | 4 |
| 93 | 106 | 97 | 3 | 6 |
| 94 | 75 | 126 | 14 | 8 |
| 95 | 124 | 32 | 11 | 21 |
| 96 | 105 | 74 | 11 | 21 |
| 97 | 148 | 119 | 10 | 16 |
| 98 | 144 | 89 | 21 | 9 |
| 99 | 150 | 59 | 10 | 13 |
| 100 | 134 | 4 | 19 | 10 |
| 101 | 59 | 90 | 22 | 15 |
| 102 | 20 | 14 | 19 | 22 |
| 103 | 49 | 53 | 10 | 6 |
| 104 | 38 | 40 | 2 | 18 |
| 105 | 142 | 76 | 23 | 8 |
| 106 | 54 | 52 | 2 | 6 |
| 107 | 22 | 49 | 16 | 13 |
| 108 | 107 | 118 | 14 | 8 |
| 109 | 1 | 41 | 22 | 0 |
| 110 | 128 | 35 | 8 | 17 |
| 111 | 123 | 106 | 2 | 0 |
| 112 | 27 | 42 | 14 | 9 |
| 113 | 30 | 19 | 6 | 19 |
| 114 | 119 | 30 | 14 | 4 |
| 115 | 149 | 70 | 22 | 0 |
| 116 | 112 | 148 | 22 | 9 |
| 117 | 155 | 13 | 18 | 21 |
| 118 | 146 | 54 | 11 | 0 |
| 119 | 53 | 65 | 19 | 5 |
| 120 | 41 | 124 | 7 | 3 |
| 121 | 21 | 107 | 21 | 11 |
| 122 | 65 | 102 | 7 | 19 |
| 123 | 101 | 108 | 18 | 5 |
| 124 | 103 | 34 | 1 | 1 |
| 125 | 90 | 75 | 6 | 9 |
| 126 | 118 | 86 | 3 | 8 |
| 127 | 34 | 51 | 2 | 18 |
| 128 | 26 | 77 | 4 | 14 |
| 129 | 73 | 8 | 21 | 6 |
| 130 | 40 | 129 | 12 | 8 |
| 131 | 145 | 82 | 8 | 9 |
| 132 | 52 | 39 | 16 | 19 |
| 133 | 13 | 147 | 12 | 0 |
| 134 | 19 | 21 | 7 | 19 |
| 135 | 35 | 158 | 7 | 0 |
| 136 | 74 | 22 | 22 | 10 |
| 137 | 14 | 142 | 12 | 20 |
| 138 | 129 | 87 | 8 | 18 |
| 139 | 51 | 1 | 9 | 21 |
| 140 | 91 | 154 | 15 | 4 |

-continued

| Block Connections | | | Carry Functions | |
|---|---|---|---|---|
| Output- | A input | B input- | CR | CL |
| 141 | 12 | 12 | 5 | 9 |
| 142 | 85 | 123 | 22 | 22 |
| 143 | 158 | 105 | 17 | 1 |
| 144 | 97 | 137 | 17 | 22 |
| 145 | 154 | 11 | 15 | 3 |
| 146 | 76 | 149 | 6 | 18 |
| 147 | 70 | 109 | 5 | 4 |
| 148 | 147 | 145 | 18 | 8 |
| 149 | 8 | 155 | 4 | 3 |
| 150 | 4 | 103 | 14 | 3 |
| 151 | 102 | 38 | 7 | 16 |
| 152 | 77 | 150 | 20 | 7 |
| 153 | 89 | 112 | 13 | 10 |
| 154 | 71 | 144 | 4 | 13 |
| 155 | 32 | 146 | 17 | 1 |
| 156 | 29 | 71 | 19 | 14 |
| 157 | 42 | 29 | 8 | 20 |
| 158 | 109 | 43 | 12 | 14 |
| 159 | 14 | 26 | 1 | 8 |

Other Embodiments

Other embodiments are possible. For example, the particular set of random connections associated with the high-order bits of the calculation stage 120 could be different. Embodiments associated with such variations in the set of random connections may have the same distributive properties as described above but may yield different answer words. A manufacturer may use different random assignments for different chips or customers according to some embodiments. In some embodiments the split between odd/even ordered and randomly ordered bits could be something other than 50%/50%.

The sum and/or carry equations may vary according to some embodiments. Some embodiments may use sets of equations that do not utilize all of the inputs, such as Bc+cB and the like. These may be less desirable in that they do not utilize the value of one of the bits (in this case "A,") but they may increase the variety of bit circuits that can be built beyond the 24 listed above. Some embodiments may use non-commutative four-input calculation sub-modules whose output depends on each of the inputs. Some embodiments may use calculation sub-modules with greater than two input bits. The carry and sum equations associated with these embodiments may have more terms than the two-bit adders, and their answers may therefore be more time-consuming to compute on a software clone.

Output Register Stage

The apparatus 100 may also optionally include an output register stage 155 to store a result produced by the calculation stage 120. In some embodiments, outputs from the apparatus 100 may be clocked back into the input register stage 110 for a selected number of iterations, as previously mentioned. Alternatively, some embodiments may use multiple, concatenated instances of the calculation stage 120.

System Embodiments

In another embodiment, a system 180 may include one or more of a TID apparatus such as the apparatus 100 to receive an interrogation command, to perform a series of logical operations to calculate an answer, and to return the answer as a response within an established maximum or selected length of time.

The system 180 may also include an interrogation and timing apparatus 106. The interrogation and timing apparatus 106 may issue the interrogation command to the apparatus 100. The interrogation and timing apparatus 106 may also confirm that a length of time between sending the interrogation command and receiving an answer as a response is within the established maximum length of time. If so, the interrogation and timing apparatus 106 may confirm that the answer word received in the response matches an anticipated answer word known by the interrogation and timing apparatus 106. In some embodiments the interrogation and timing apparatus 106 may calculate the anticipated answer word in hardware or in software to compare to the answer word in the response from the apparatus 100.

The apparatus 100; the interrogation and timing apparatus 106; the input register stage 110; the bit mixers 114, 116; the calculation stage 120; the calculation sub-modules 121; the outputs 122, 124; the carry inputs 128, 130, 148; the carry outputs 132, 134, 144; the adders 136, 138, 139, 146; the feedback circuit 140; the output register stage 155; and the system 180 may all be characterized as "modules" herein.

Modules associated with the interrogator 106 may include hardware circuitry, optical components, single or multi-processor circuits, memory circuits, software program modules and objects, firmware, and combinations thereof, as desired by the architect of the system 100 and as appropriate for particular implementations of various embodiments. Modules associated with the apparatus 100 comprise integrated hardware logic to achieve the calculation speeds capable of distinguishing the apparatus 100 from software clone implementations, as previously described.

The apparatus and systems of various embodiments may be useful in applications other than authenticating a source of a received data stream. Thus, various embodiments of the invention are not to be so limited. The illustrations of the apparatus 100 and the system 180 are intended to provide a general understanding of the structure of various embodiments. They are not intended to serve as a complete description of all the elements and features of apparatus and systems that might make use of the structures described herein.

The novel apparatus and systems of various embodiments may comprise or be incorporated into electronic circuitry used in computers, communication and signal processing circuitry, single-processor or multi-processor modules, single or multiple embedded processors, multi-core processors, data switches, and application-specific modules including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others. Some embodiments may include a number of methods.

Interrogation and Timing Methods

Figure 2:
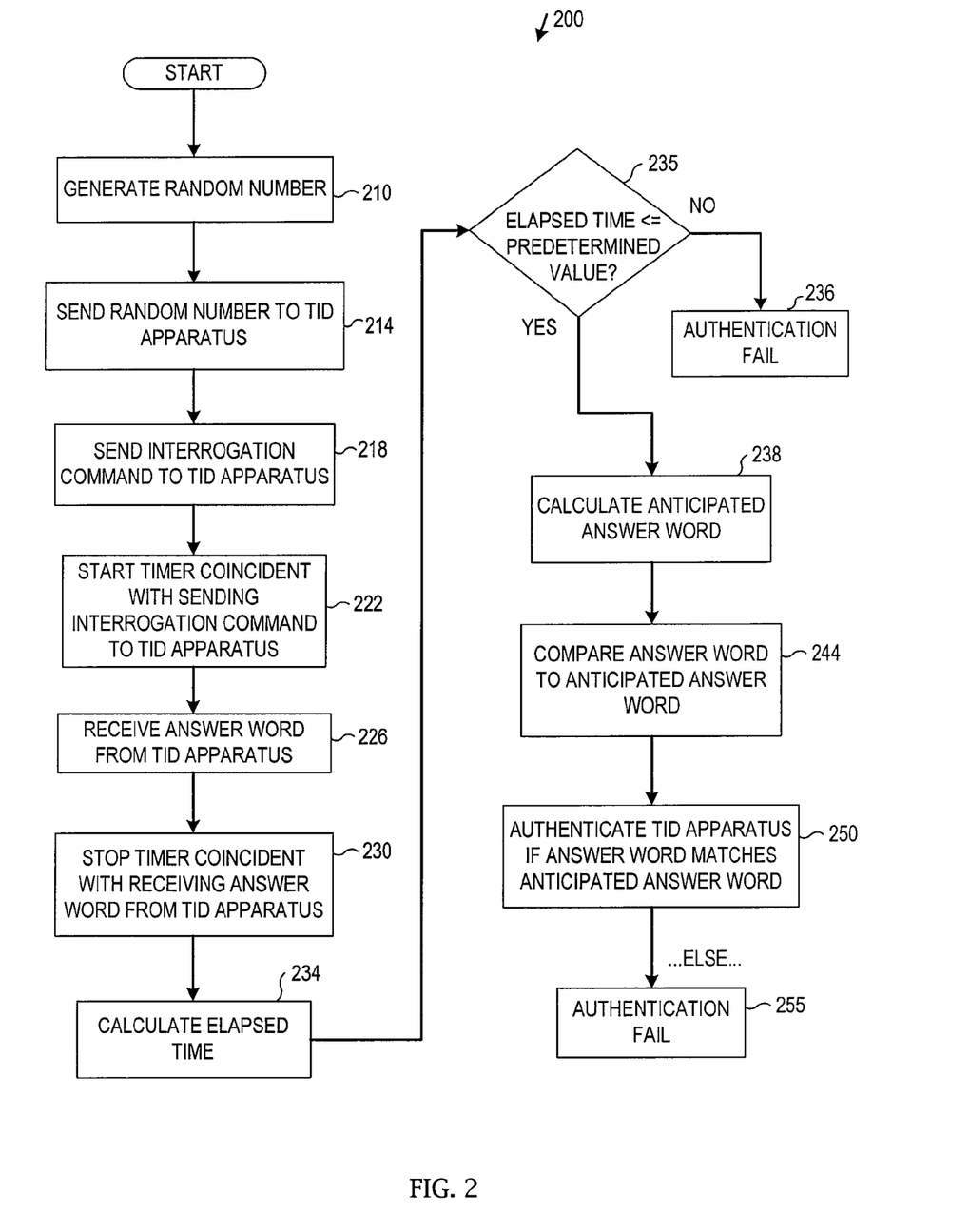
FIG. 2 is a flow diagram illustrating a method according to an example embodiment.

FIG. 2 is a flow diagram illustrating a method 200 according to an example embodiment. The method 200 may be performed by an interrogation and timing apparatus such as the interrogation and timing apparatus 106 of FIG. 1. The interrogation and timing apparatus may attempt to authenticate a sender of a data sequence received at the interrogation and timing apparatus. For example, a radio-frequency identification (RFID) controller may attempt to authenticate RFID responses to RFID interrogations sent by the RFID controller. Without a reliable authentication system in place, an unscrupulous entity may substitute one or more clone RFID tags for legitimate RFID tags. The clone RFID tags may contain intentionally substituted user information in an attempt to effect a fraudulent RFID transaction.

In some embodiments the method 200 may commence at block 210 with generating a random number at the interrogation and timing apparatus. The method 200 may continue with sending the random number to the TID apparatus, at block 214. The random number may be used by the TID apparatus as an input word to a calculation sequence to generate the answer word. In alternative embodiments the input word may be chosen randomly at the TID or may comprise a TID hardware serial number, among other possible ways of generating the input word.

The method 200 may also include sending an interrogation command to the TID apparatus from the interrogation and timing apparatus, at block 218. The method 200 may further include starting a timer substantially coincident with sending the interrogation command, at block 222. The method 200 may also include receiving an answer word from the TID apparatus, at block 226. The answer word may have been calculated at combinational hardware logic speeds at the TID apparatus. In such case, the calculation may have been performed within a time period expected of a hardware device but not expected of a software clone system.

The method 200 may continue at block 230 with stopping the timer substantially coincident with receiving the answer word from the TID apparatus. The method 200 may include calculating an elapsed time period as calculated from the timer start time and the timer stop time, at block 234. The method 200 may also include comparing the elapsed time to a predetermined value, at block 235. If the elapsed time is not less than or equal to the predetermined value, the method 200 may fail the authentication, at block 236.

If the elapsed time is less than or equal to the predetermined value, the method 200 may continue at block 238 with calculating an anticipated answer word at the interrogation and timing apparatus. The method 200 may also include comparing the answer word to the anticipated answer word, at block 244. An iteration of the method 200 may terminate at block 250 with authenticating the TID apparatus if the answer word matches the anticipated answer word. If the answer word does not match the anticipated answer word the method 200 may fail the authentication, at block 255.

Timed Identification Methods

Figure 3:
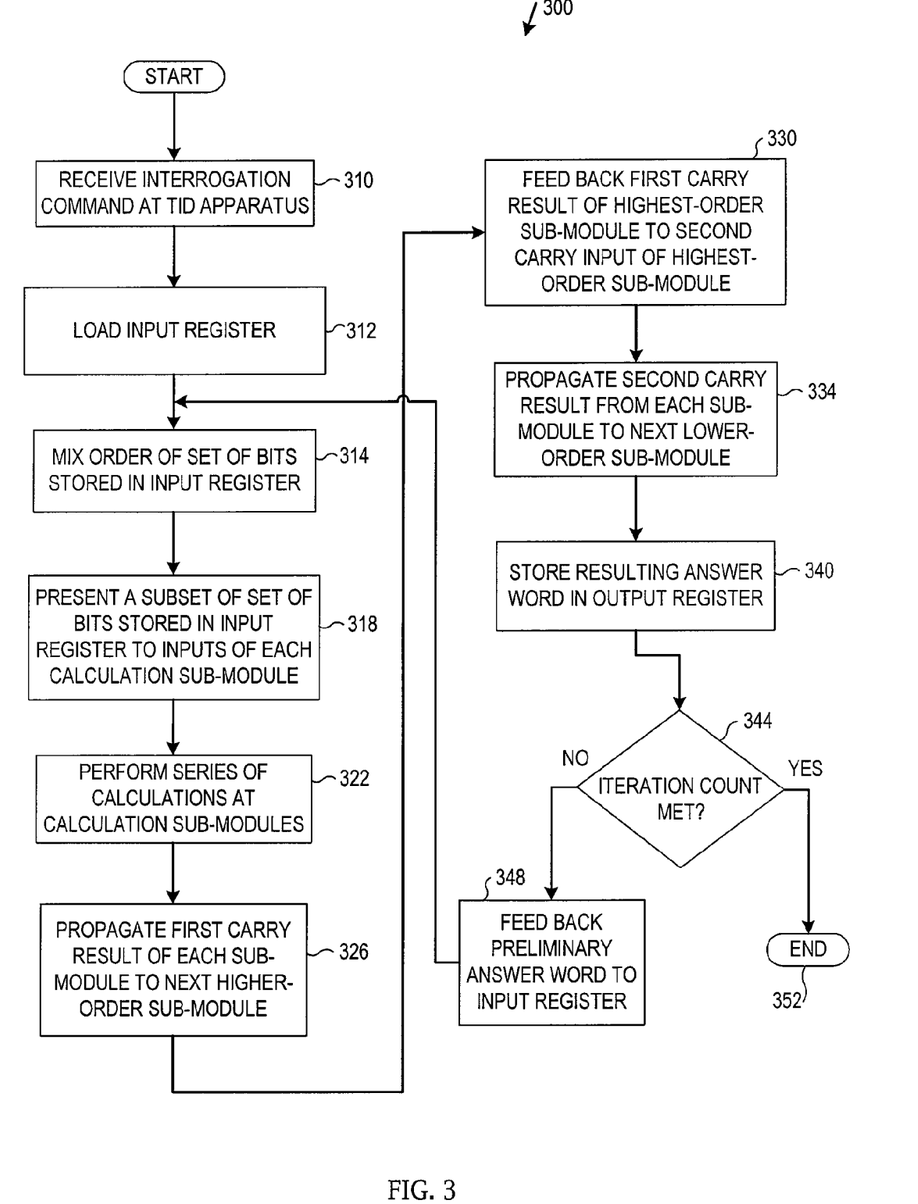
FIG. 3 is a flow diagram illustrating a method according to an example embodiment.

FIG. 3 is a flow diagram illustrating a method 300 according to an example embodiment. The method 300 may be performed by a TID apparatus such as the apparatus 100 of FIG. 1. The method 300 may commence at block 310 with receiving an interrogation command at the TID apparatus from an interrogation and timing apparatus as discussed above. The issuance of the interrogation command may occur substantially coincident with the start of a timer at the interrogation and timing apparatus.

The method 300 may also include loading an input register, at block 312. In some embodiments the input register may be loaded from the interrogation and timing apparatus. The method 300 may continue with mixing the order of a set of bits stored in the input register, at block 314. The method 300 may also include presenting a subset of the set of bits to inputs associated with each of an ordered series of calculation sub-modules, at block 318. The bit-order may be mixed as the subsets of bits are input to the calculation sub-modules.

The method 300 may further include performing a series of calculations at the calculation sub-modules, at block 322. The series of calculations may include propagating a first carry result of a calculation performed by each of the calculation sub-modules, at block 326. The first carry result may be propagated to a next higher-order sub-module to be used in a calculation performed by the next higher-order sub-module. The method 300 may also include feeding back the first carry result of the highest-order calculation sub-module to a second carry input associated with the highest-order calculation sub-module, at block 330. The method 300 may further include propagating a second carry result of the calculation performed by each of the calculation sub-modules to a next lower-order sub-module, at block 334. The second carry result may be used in a calculation performed by the next lower-order sub-module.

The method 300 may continue at block 340 with storing an answer word resulting from the calculations. The answer word may include outputs of each of the calculation sub-modules and may be stored in an output register. The contents of the output register may subsequently be sent to the interrogation and timing apparatus and may stop the timer within a selected or predetermined maximum length of time.

Some embodiments may perform multiple iterations of input word mixing and calculations at the calculation sub-modules. The method 300 may thus include testing an iteration counter to determine whether a specified number of iterations have been performed, at block 344. If not, the method 300 may include feeding back a preliminary answer word to the input register, at block 348. The preliminary answer word may be used as a new input word in a subsequent iteration of the series of calculations. If the test of the iteration counter at block 344 indicates that the specified number of iterations has completed, the method may terminate, at block 352

It is noted that the activities described herein may be executed in an order other than the order described. The various activities described with respect to the methods identified herein may also be executed in repetitive, serial, and/or parallel fashion.

Differential Execution Time Estimates

The following code represents one possible software emulation of the above-described hardware methods. It is noted that this example code does not incorporate the non-standard carry equations disclosed herein. As such, execution times associated with the example code may be conservative. That is, execution times for an actual software emulation of the disclosed hardware embodiments are likely to be longer than the following estimates.

Assuming a 0.5 nanosecond gate delay associated with the disclosed hardware embodiments, a single 160 bit hardware-implemented calculation stage would take approximately 160 nanoseconds to 320 nanoseconds to compute a single iteration. A software emulation of the calculation stage operations using a 25 MHz AVR microprocessor, would, on the other hand, take approximately 89 microseconds per iteration. Embodiments herein take advantage of these large differential execution times to distinguish a legitimate hardware-based TID from a software clone that might be quickly assembled.

| cycles | | |
|---|---|---|
| | | compute partial sum on 'left pass' |
| 1 | bld x<a | extract input bit A |
| 1 | bld y<b | extract input bit B |
| 1 | add x,y->j | assume input CL is in C flag |
| | | this might have to be two instructions |
| 1 | lsl j | put the bit where it belongs in the proper sum byte |
| 1 | or j, sum | or this bit into the proper byte within the sum long word |
| | | compute left carry |
| 0.5 | neg x | maybe the carry is computed using A bar |
| 0.5 | neg y | maybe the carry is computed using B bar |
| 1 | add x,y | ignore sum, this sets the carry flag for the next bit |
| | | the above may be repeated 160 times. |
| | | compute right carry |
| 1 | bld x<a | extract input bit A |
| 1 | bld y<b | extract input bit B |
| 0.5 | neg x | maybe the carry is computed using A bar |
| 0.5 | neg y | maybe the carry is computed using B bar |
| 1 | add x,y | ignore sum, this sets the carry flag for the next bit |
| | | XOR right carry with previously computed partial sum |
| 2 | brcs done | nothing to do if carry flag is a 0 |
| | ldi j<1 | 'free' since I assigned 2 cycles to the branch |
| 0.5 | lsl j | put the bit where it belongs in the proper sum byte, runs on 50% of the bits |
| 0.5 | xor j, sum | or this bit into the proper byte within the sum long word, runs on 50% of the bits |
| | done: | |
| | | and this may also be repeated 160 times. |
| 14 | cycles for each bit | |
| 560 | ns per bit at 25 MHz | |

The apparatus, systems, and methods disclosed herein may thus perform a timed sequence of calculations in a hardware TID apparatus. The differential time needed to perform the calculations in the hardware TID apparatus versus in a software emulation enables the detection of a software clone imposter during an authentication process. Increased levels of security may result, even if authentication secrets are compromised.

The accompanying figures that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims and the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover adaptations or variations of various embodiments. Combinations of the above embodiments and other embodiments not specifically described herein will be apparent to those of skill in the art upon reviewing the above description.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A timed identification (TID) apparatus, comprising:
an input register stage comprising one or more input registers that store an input word that includes a plurality of bits in a particular order;
one or more bit mixers coupled to the input register stage, wherein each of the bit mixers is configured to mix the particular order of the plurality of bits in the input word to generate a bit-mixed word that includes a plurality of bits in an order different from the particular order of the plurality of bits in the input;
a calculation stage coupled to each of the one or more bit mixers, wherein the calculation stage receives the bit-mixed word and comprises an ordered series of adders each configured to perform calculations on a selected number of bits included in the bit-mixed word and a carry resulting from a calculation performed by another adder on a different selected number of bits included in the bit-mixed word; and
an output register stage that stores a result produced by the calculation stage.

2. The TID apparatus of claim 1, wherein the adders are single-bit adders.

3. The TID apparatus of claim 2, wherein each single-bit adder comprises a ripple-carry adder.

4. The TID apparatus of claim 1, wherein at least one carry input and at least one carry output is associated with each adder.

5. The TID apparatus of claim 1, further comprising:
a feedback circuit associated with the calculation stage and configured to apply a carry output of the calculation stage to a carry input of the calculation stage.

6. The TID apparatus of claim 1 implemented in hardware combination logic on an integrated circuit, the hardware combinational logic operating at a speed sufficient to produce the result of the calculation stage within a specified maximum length of time.

7. The TID apparatus of claim 6, further comprising:
silicon-layer interconnections between at least two of the input register stage, the one or more bit mixers, the calculation stage, or the output register stage.

8. The TID apparatus of claim 6, further comprising:
at least one of false interconnections in the metallization layers or false contact pads to disguise functional structures associated with the TID apparatus.

9. An apparatus, comprising:
an input register stage comprising one or more input registers that store an input word that includes a plurality of bits in a particular order;
one or more bit mixers coupled to the input register stage, wherein each of the bit mixers is configured to mix the particular order of the plurality of bits in the input word to generate a bit-mixed word that includes a plurality of bits in an order different from the particular order of the plurality of bits in the input word;
an ordered series of ripple-carry adders coupled to each of the one or more bit mixers, wherein each ripple-carry adder in the ordered series of ripple-carry adders receives the bit-mixed word and performs a series of calculations on selected bits of the bit-mixed word and a carry resulting from calculations performed by another ripple-carry adder, where each ripple-carry adder performs calculations on a selected number of bits that is different than other ripple-carry adders; and
an output register stage that stores a result of the series of calculations on the bit-mixed word performed by the ordered series of ripple-carry adders.

10. The apparatus of claim 9, further comprising:
a first carry output associated with each ripple-carry adder in the ordered series of ripple-carry adders, the first carry output to propagate a first carry result of a calculation performed by the ripple-carry adder to a first carry input of a next higher-order ripple-carry adder, the first carry result to be used in a calculation performed by the next higher-order ripple-carry adder;
a first carry output of a highest-order one of the ordered series of ripple-carry adders to feed back to a second carry input associated with the next highest-order one of the ordered series of ripple-carry adders; and
a second carry output associated with each rippled-carry adder to propagate a second carry result of the calculation performed by each of the ordered series of ripple-carry adders to a next lower-order ripple-carry adder to be used in a calculation performed by the next lower-order ripple-carry adder.

11. A system, comprising:
an interrogation and timing apparatus; and
a timed identification (TID) apparatus,
wherein the interrogation and timing apparatus is configured to:
send to the TID apparatus an interrogation command,
determine that a length of time between sending the interrogation command to the TID apparatus and receiving a response from the TID apparatus is within a predetermined maximum length of time,
based on determining that the length of time between sending the interrogation command to the TID apparatus and receiving a response from the TID apparatus is within a predetermined maximum length of time, determine that the received response matches an anticipated response known by the interrogation and timing apparatus, and
authenticate the TID apparatus based on determining that the received response matches an anticipated response known by the interrogation and timing apparatus, and
wherein the timed identification (TID) apparatus is configured to:
receive from the interrogation and timing apparatus the interrogation command,
perform a series of logical operations to calculate the response, where the series of logical operations is implemented by hardware in the TID apparatus that is configured to contribute to a speed of the calculation of the response, and
return the response within the predetermined maximum length of time, wherein the returned response matches the anticipated response known by the interrogation and timing apparatus.

12. The system of claim 11, wherein the TID apparatus comprises:
an input register stage comprising one or more input registers that store an input word that includes a plurality of bits in a particular order;
one or more bit mixers coupled to the input register stage, wherein each of the bit mixers is configured to mix the particular order of the plurality of bits in the input word to generate a bit-mixed word that includes a plurality of bits in an order different from the particular order of the plurality of bits in the input word;
a calculation stage coupled to each of the one or more bit mixers, wherein the calculation stage receives the bit-mixed word and performs calculation and shift operations on the bit-mixed word; and
an output register stage that stores a result produced by the calculation stage.

13. The system of claim 12, wherein the calculation stage comprises an ordered series of calculation sub-modules, and wherein each calculation sub-module comprises a single-bit ripple-carry adder.

14. The system of claim 11, wherein the TID apparatus is implemented in hardware combinational logic operating at a speed sufficient to calculate and return the response within the maximum length of time.

15. A method, comprising:
receiving an interrogation command from an interrogation and timing apparatus, an issuance of the interrogation command substantially coincident with the start of a timer at the interrogation and timing apparatus;
loading an input word that includes a set of bits in a particular order into one or more input registers;
mixing the particular order of the set of bits stored in the one or more input registers while presenting a subset of the set of bits to one or more inputs associated with a ripple-carry adder included in an ordered series of ripple-carry adders;

performing a series of calculations at each of the ripple-carry adders on the provided subset of the set of bits and a carry resulting from another ripple-carry adder, where each ripple-carry adder performs a calculation on a different subset of the set of bits;

storing an answer word comprising outputs of each of the calculation sub-modules in an output register; and sending the answer word to the interrogation and timing apparatus, wherein the receipt of the answer word by the interrogation and timing apparatus stops the timer within a predetermined maximum length of time.

16. The method of claim 15, further comprising:
propagating a first carry result of a calculation performed by each of the ripple-carry adders to a next higher-order ripple-carry adder to be used in a calculation performed by the next higher-order ripple-carry adder.

17. The method of claim 15, further comprising:
feeding back the first carry result of the highest-order one of the ripple-carry adders to a second carry input associated with the highest-order one of the ripple-carry adders.

18. The method of claim 17, further comprising:
propagating a second carry result of the calculation performed by each of the ripple-carry adders to a next lower-order ripple-carry adder to be used in a calculation performed by the next lower-order ripple carry adder.

19. The method of claim 15, wherein the input word is an answer word stored in the output register and fed back as an input word for loading into the one or more input registers.

20. The method of claim 15, further comprising:
loading the input register with an input word received from the interrogation and timing apparatus.

21. The method of claim 15, further comprising:
generating a random number for use as the input word.

* * * * *